United States Patent
Gupta et al.

[11] Patent Number: 5,715,092
[45] Date of Patent: Feb. 3, 1998

[54] FERROELECTRIC LIGHT FREQUENCY DOUBLER DEVICE WITH A SURFACE COATING AND HAVING AN INVERTED DOMAIN STRUCTURE

[75] Inventors: Mool C. Gupta, Webster; Alan C. G. Nutt, Rochester, both of N.Y.

[73] Assignee: Eastman Kodak Company, Rochester, N.Y.

[21] Appl. No.: 268,373

[22] Filed: Jun. 29, 1994

[51] Int. Cl.$^6$ ................................................. G02F 1/37
[52] U.S. Cl. ..................... 359/566; 359/332; 359/576; 385/37
[58] Field of Search ................................ 359/566, 567, 359/571, 573, 328, 329, 332, 568, 569, 576; 385/122, 141, 144, 145, 37

[56] References Cited

U.S. PATENT DOCUMENTS

| | | | |
|---|---|---|---|
| 4,706,094 | 11/1987 | Kubick | 343/754 |
| 4,852,961 | 8/1989 | Yamamoto et al. | 385/122 |
| 4,913,525 | 4/1990 | Asakura et al. | 359/559 |
| 4,915,463 | 4/1990 | Barbee, Jr. | 359/360 |
| 5,028,109 | 7/1991 | Lawandy | 385/122 |
| 5,151,814 | 9/1992 | Grinberg et al. | 359/209 |
| 5,151,965 | 9/1992 | Rikken et al. | 359/332 |
| 5,218,661 | 6/1993 | Droste et al. | 359/332 |
| 5,249,250 | 9/1993 | Yamada et al. | 359/328 |
| 5,377,044 | 12/1994 | Tomono et al. | 359/566 |
| 5,436,758 | 7/1995 | Agostinelli et al. | 359/332 |
| 5,452,385 | 9/1995 | Izumi et al. | 385/37 |
| 5,473,448 | 12/1995 | Yoshinaga et al. | 359/51 |
| 5,482,799 | 1/1996 | Isao et al. | 430/5 |
| 5,495,543 | 2/1996 | Alferness et al. | 385/37 |

FOREIGN PATENT DOCUMENTS

| | | | |
|---|---|---|---|
| 1-283527 | 11/1989 | Japan | 385/37 |
| 2-213807 | 8/1990 | Japan | 385/37 |
| 4-56926 | 2/1992 | Japan | 359/328 |

OTHER PUBLICATIONS

Domain inversion in KTiOPO4 using electron beam scanning, Gupta et al, Appl. Phys. Lett. 63 (9) 30 Aug. 1993 pp. 1167–1169.

Domain inversion in LiTaO3 by electron beam, Hsu et al, Appl. Phys. Lett. 60(1) 6 Jan. 1992, pp. 1–3.

Domain inversion in LiNbO3 using direct electron–beam writing, Nutt et al Appl. Phys. Lett. 60(23), 8 Jun. 1992, pp. 2828–2830.

(List continued on next page.)

Primary Examiner—Timothy P. Callahan
Assistant Examiner—Kenenth B. Wells
Attorney, Agent, or Firm—Raymond L. Owens

[57] ABSTRACT

A ferroelectric light frequency doubler device has a surface coating on one surface of an initially uniformly poled ferroelectric crystal, the surface coating on the one surface being exposed to a scanning electron beam so as to form a spatially periodically alternating polarity domain structure in the crystal. The surface coating can be of an inorganic material or it can be of a polymeric organic material. The surface coating can be adapted to be patterned to form an optical grating in registrative alignment with the spatially periodically alternating polarity domain structure when such optical grating is desired. Alternatively, the surface coating may remain on the device as a protective coating, or it may be removed upon formation of the alternating polarity domain structure in the crystal. When the surface coating is adapted to be responsive to the scanning electron beam, the spatially periodically alternating domains in the ferroelectric crystal and a latent optical grating pattern in the surface coating are established at the same time by the electron beam. The latent optical grating pattern can be formed into an optical grating during a subsequent pattern development step.

19 Claims, 8 Drawing Sheets

OTHER PUBLICATIONS

Ito, Fabrication of periodic domain grating by electron beam writing and its application to nonlinear optics, Nonlinear Optics, Elsevier Science Publishers B.V., 1992 pp. 495–500.

Fujimura et al, Blue light generation in LiNbO3 waveguide SHG device with first order domain–inverted grating formed by eb scanning Electronic Letters, vol. 28, No. 20, 24 Sep. 1992 pp. 1868–1869.

Yamada et al, Fabrication of periodically reversed domain structures for SHG in LiNbO3 by direct electron beam lithography at room temperature Electronics Letters, vol. 27, No. 10, 9 May 1991, pp. 828–829.

FERROELECTRIC LIGHT FREQUENCY DOUBLER DEVICE WITH A SURFACE COATING AND HAVING AN INVERTED DOMAIN STRUCTURE

FIELD OF THE INVENTION

The present invention relates generally to a ferroelectric device useful for generation of frequency doubled light at a light exit surface from light incident at a light entrance surface, and more particularly to a ferroelectric device having a surface coating on one surface with at least a portion of the coating formed as an optical grating registratively aligned with respect to zones of alternating polarity of electric field domains generated in a ferroelectric crystal by electron beam exposure of the surface coating.

BACKGROUND OF THE INVENTION

Commercially available ferroelectric crystals have a uniformly poled electric field domain extending within the crystals between an upper and a lower crystal surface. Such uniform domains do not provide the so-called phase matching properties of the crystal which are required for efficient operation of a ferroelectric light frequency doubler device. In order to provide phase matching in such uniformly poled crystals, various approaches have been developed to generate spatially periodically arranged zones of inverted polarity so that distinct zones with a periodicity of alternating polarity of the domains are provided within the crystal.

Among the approaches useful for generating polarity inverted zones are electron beam exposure, ion beam exposure, proton exchange followed by heat treatment, and inverting some regions of a uniformly prepoled crystal by repoling with an applied electric field.

It has been recognized that the efficiency of a ferroelectric light frequency doubler device to convert light, for example, laser light of a first frequency (e.g., laser light from a so-called solid-state laser diode of a light frequency corresponding to a wavelength of laser light emission of about 800 nanometers) to light having a second frequency which is double the first frequency (corresponding to a wavelength of about 400 nanometers) is significantly enhanced if the periodicity of alternating polarity ferroelectric zones or domains in the crystal is of such value that the incident laser light of the first frequency is matched to the periodicity in terms of the optical polarization phase angle of the incident light. Accordingly, electron beam and ion beam exposure have evolved as one of the preferred approaches to generate spatially periodically arranged zones or domains of alternating polarity, and hence, the desirable phase matching property, in a ferroelectric crystal, because such beams can be provided with relatively small beam diameter, for example, with a beam diameter in the range between about 0.3 micrometer and about 1.5 micrometers, by commercially available electron beam or ion beam generating means. Such beam generating means also frequently includes beam scanning means or beam deflection means, so that an electron or ion beam can be scanned across one surface of a uniformly poled ferroelectric crystal at spatially periodic intervals, thereby inducing spatially periodic domains of alternating polarity within the crystal.

While scanned electron and ion beams can provide a plurality of relatively closely spaced and well-defined domains of alternating polarity within an initially uniformly poled ferroelectric crystal, it has been observed that a surface region of the crystal surface on which the electron or ion beam was incident appears damaged to a depth of up to several micrometers, most likely due to microscopic cracking or crazing within the surface region related to the incidence of the relatively energetic electrons or ions which deposit a significant amount of charge on the surface by using a relatively concentrated beam. Damaged surface regions do not exhibit the desired distinct alternating polarity zones. Therefore, such damaged surface regions have to be removed, usually by mechanical grinding and polishing, until a new surface free of damage can be rendered. Mechanical polishing procedures can, of course, introduce mechanical stress or strain on a crystal, thus reducing the potential yield of ferroelectric light frequency doubler devices having optical properties deemed acceptable for efficient light frequency doubling. Also, such polishing procedures frequently are time consuming, thereby adding to the cost of a device manufactured in this manner.

SUMMARY OF THE INVENTION

It is, therefore, an object of the invention to provide ferroelectric light frequency doubler devices which are not subject to a damaged surface region upon formation of distinct inverted polarity domains by a scanned electron beam.

It is another object to provide ferroelectric light frequency doubler devices with a surface coating on one device surface, the coating protecting the one device surface during the formation of distinct inverted polarity domains and during subsequent use of the devices.

It is a further object to provide an optical grating on that surface of a ferroelectric light frequency doubler device on which a scanned electron beam was incident during formation of distinct inverted polarity domains in a ferroelectric crystal, the optical grating desirably being registratively aligned with respect to the distinct inverted polarity domains.

The above objects are achieved in a ferroelectric light frequency doubler device having a surface coating, the device comprising:

a ferroelectric crystal having a length dimension L, a width dimension W, and a thickness dimension T, and characterized by an upper surface of area L×W and an opposing lower surface which is separated from the upper surface by the thickness dimension T, a light entrance surface of area W×T and an opposing light exit surface separated from the light entrance surface by the crystal length dimension L;

a plurality of distinct ferroelectric domains extending from the upper surface toward the lower surface of the crystal, and extending from the light entrance surface toward the light exit surface of the crystal, the ferroelectric domains disposed substantially parallel to the light entrance and light exit surfaces and being distinct by having a periodicity of an alternating polarity among each successive domain of the plurality of domains; and the surface coating being disposed on the upper surface of the crystal, and patterned to function as an optical grating registratively aligned with respect to each second one of the distinct ferroelectric domains extending from the upper surface.

Viewed from one aspect the present invention is directed to a ferroelectric light frequency doubler device having a surface coating on one surface of the device.

Viewed from another aspect, the present invention is directed to a ferroelectric light frequency doubler device having a surface coating on one surface of the device at least during the formation of alternating polarity ferroelectric domains in a crystal of the device by an electron beam incident on the surface coating.

Viewed from another aspect, the present invention is directed to a ferroelectric light frequency doubler device having an inorganic coating formed as an optical grating on one surface of the device.

Viewed from another aspect, the present invention is directed to a ferroelectric light frequency doubler device having a polymeric organic coating formed as an optical grating on one surface of the device.

Viewed from another aspect, the present invention is directed to a ferroelectric light frequency doubler device with a ferroelectric waveguide layer formed on one surface of a ferroelectric crystal and having a polymeric organic coating formed as an optical grating on the surface of the waveguide layer.

Viewed from still another aspect, the present invention is directed to a ferroelectric light frequency doubler device with a ferroelectric channel waveguide formed over one portion of a surface of a ferroelectric crystal and a planar waveguide layer over another portion of the surface, and a polymeric organic coating formed as an optical grating over at least a portion of the channel waveguide and formed as a uniform coating over at least a portion of the waveguide layer.

Viewed from a further aspect, the present invention is directed to a ferroelectric light frequency doubler device having a plurality of spatially periodically arranged distinct zones of alternating ferroelectric polarity formed in one portion of the device and an optical beam steering section formed in another portion of the device, and a polymeric organic coating formed as an optical grating over at least a portion of the plurality of zones and formed as a uniform coating over the optical beam steering section.

Viewed from a still further aspect, the present invention is directed to a method of manufacturing a ferroelectric light frequency doubler device having a polymeric organic coating, wherein spatially periodic zones of alternating polarity of electric field are formed in a ferroelectric crystal by exposure to a scanned electron beam of the polymeric organic coating disposed on one surface of the crystal, and wherein the polymeric organic coating is responsive to the electron beam exposure.

The instant invention will be better understood and more fully appreciated from the following detailed description of specific embodiments when viewed in conjunction with the accompanying drawings and the claims.

DETAILED DESCRIPTION

Figure 1A:
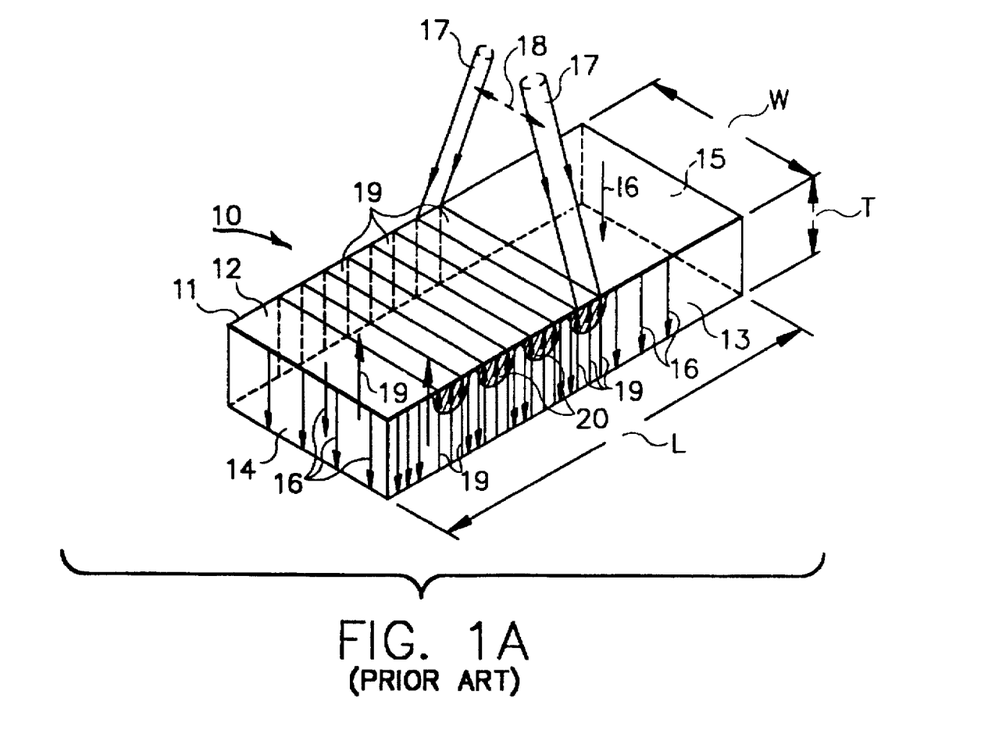
FIG. 1A is a schematic perspective view of a prior art ferroelectric light frequency doubler device, depicting damaged surface regions associated with a scanning electron beam used to invert the polarity of a uniformly prepoled electric field in a spatially periodic arrangement.
Figure 1B:
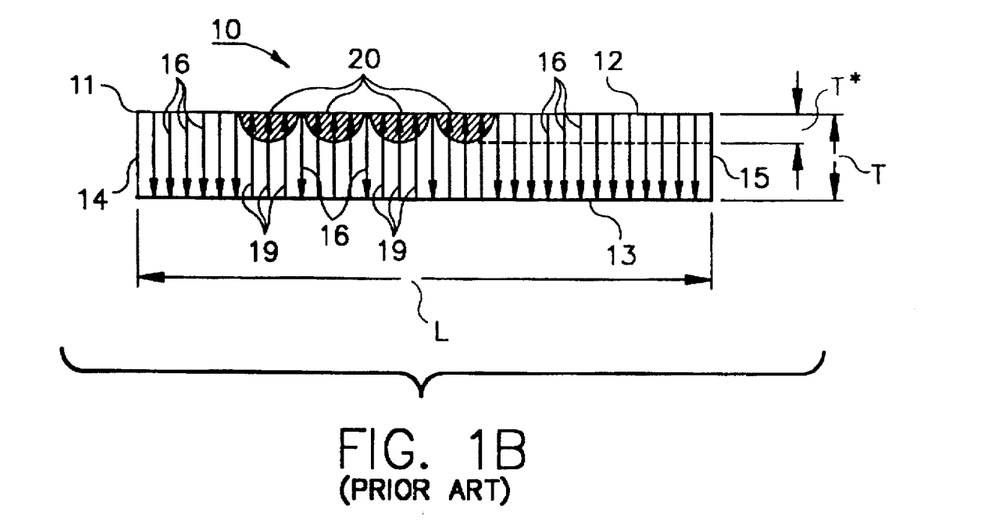
FIG. 1B is a schematic side view of the prior art device shown in FIG. 1A, further illustrating the damaged surface regions.
Figure 1C:
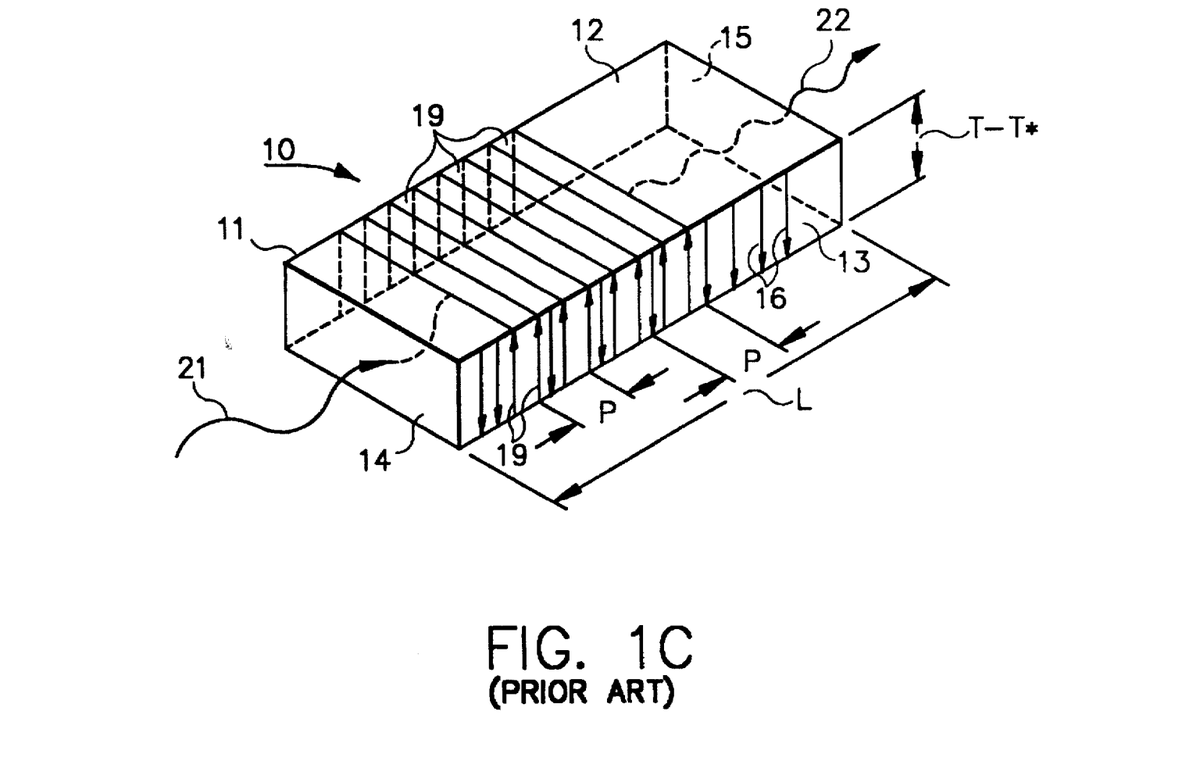
FIG. 1C is a schematic perspective view of the prior art device shown in FIG. 1B, following removal of the damaged surface regions, and indicating light frequency doubling of an incident beam of light of a first frequency.

Referring now to FIGS. 1A–C, there is shown a prior art ferroelectric light frequency doubler device 10, constructed from a commercially available ferroelectric crystal 11 having a length dimension L, a width dimension W and a thickness dimension T. Crystal surfaces important to the intended frequency doubling function of the device are an upper surface 12 and a parallel lower surface 13, and a light entrance surface 14 and a light exit surface 15, the latter surfaces separated by the crystal length dimension L. Initially uniformly poled domains 16 can be inverted in polarity (as indicated by arrows pointing in the direction of upper surface 12) by exposure to an electron beam 17 incident on upper surface 12. Electron beam 17 is a scanned electron beam having a scan or deflection 18 sufficient to scan surface 12 across its width dimension W. Beam 17 is scanned across width W in periodic intervals along the crystal length dimension L, so that spatially periodic inverted domains 19 alternate with non-inverted domains 16. Damage in surface regions 20 in the form of microcracking or crazing is associated with the electron beam exposure of the crystal surface, the damage extending from surface 12 to a depth T* of crystal thickness T. Surface damage is removed by mechanical grinding and polishing, thus leaving an undamaged crystal thickness of T–T*. A light beam 21, for example, a laser light beam of a first light frequency, is directed at light entrance surface 14. Upon traversing a plurality of alternating polarity domains 19, 16, having a periodicity P, a fraction of incident light 21 emerges as laser light 22 of a second frequency double the first frequency from the light exit surface 15 of the crystal 11. The waviness of light beams 21, 22 is drawn merely to indicate schematically different light frequencies and different amplitudes or intensifies with respect to these light beams.

Figure 2A:
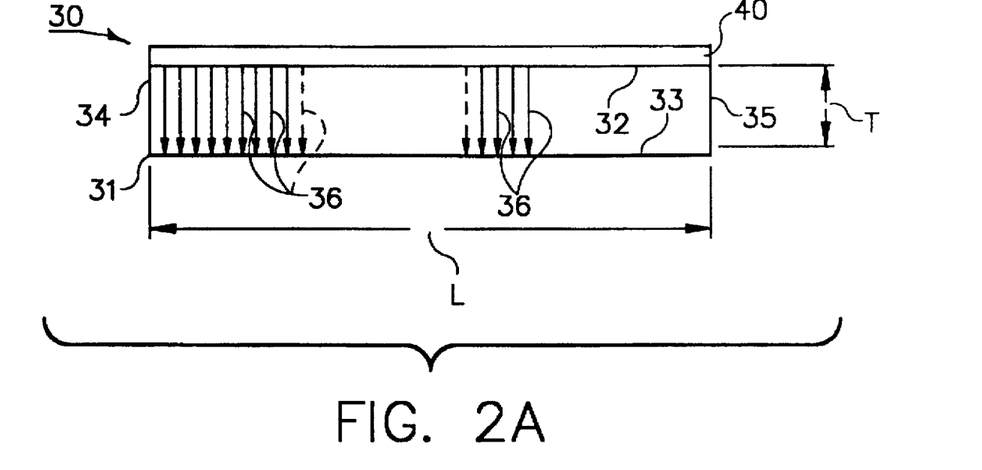
FIG. 2A is a schematic side view of a ferroelectric light frequency doubler device in accordance with the present invention, depicting a surface coating disposed on an upper surface of a uniformly poled commercially available ferroelectric crystal.
Figure 2B:
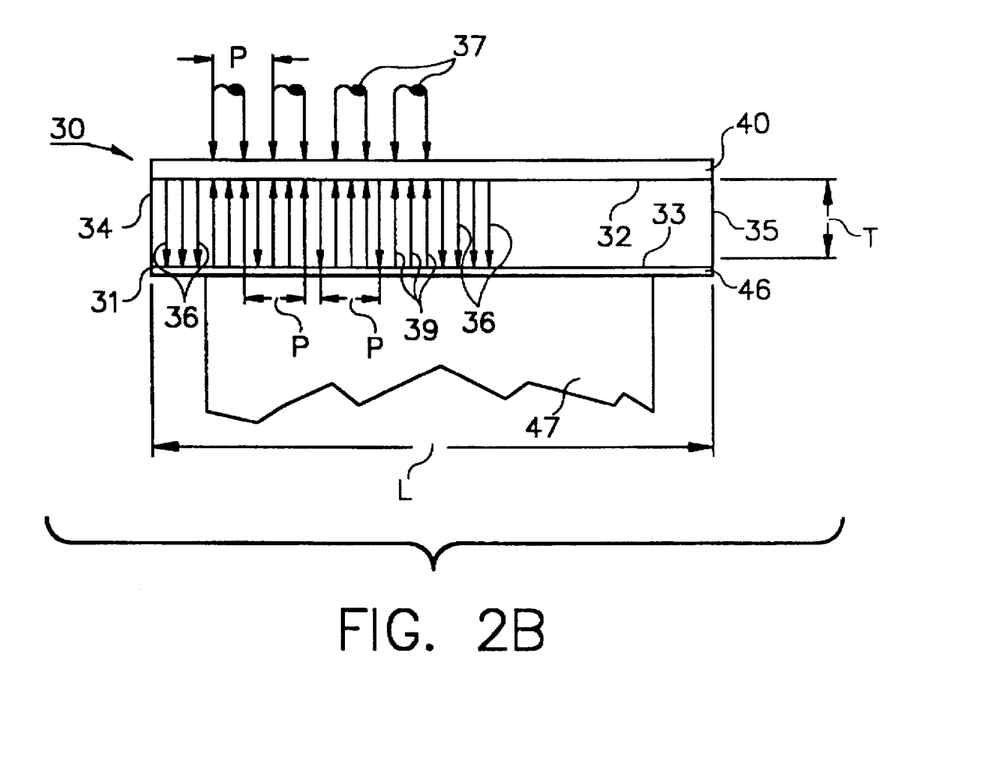
FIG. 2B is a schematic side view of the device shown in FIG. 2A, showing a lower crystal surface electrically conductively coupled to an electrically conductive mounting means, and a scanning electron beam incident on the upper surface of the surface coating and forming spatially periodic domains of alternating polarity of the electric field within the crystal.
Figure 2C:
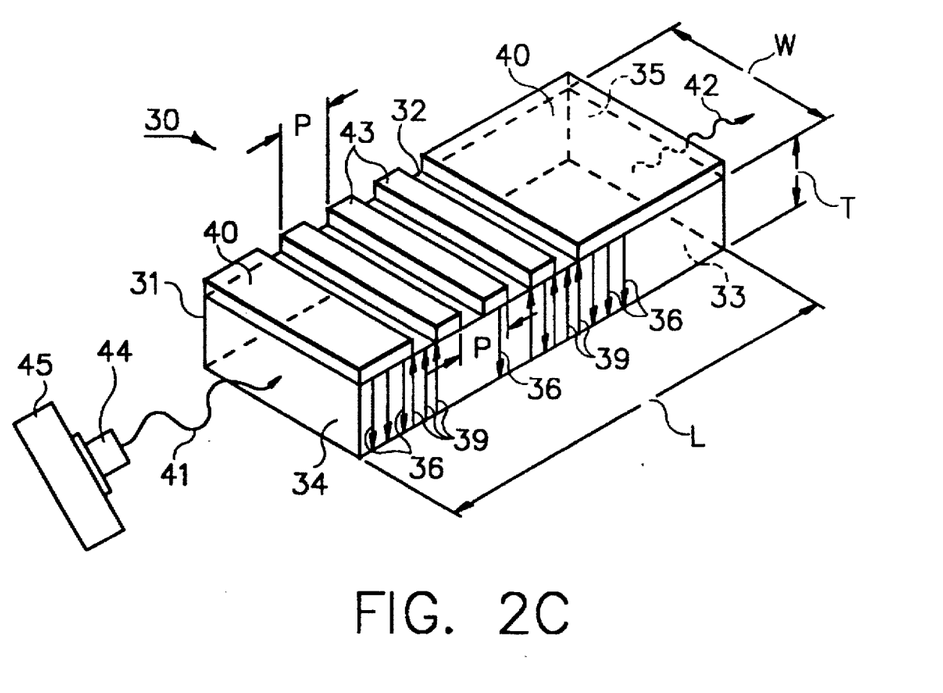
FIG. 2C is a schematic perspective view of a ferroelectric frequency doubler device in accordance with the present invention, indicating a portion of a spatially periodic optical grating formed in a surface coating in registrative alignment with spatially periodic alternating polarity domains within the crystal, and indicating light frequency doubling of an incident light beam from a solid-state laser light source.

Referring now to FIGS. 2A–C, there are shown schematically, and for the purpose of clarity of presentation, various stages in the fabrication process of a ferroelectric light frequency doubler device 30 in accordance with the invention. A uniformly poled, commercially available ferroelectric crystal 31 with upper and lower surfaces 32 and 33, respectively, and with light entrance and light exit surfaces 34 and 35, respectively, is overcoated on its upper surface 32 with a surface coating 40. Surface coating 40 can be an inorganic coating deposited on upper surface 32 by known deposition processes such as, for example, chemical vapor deposition, evaporation, and sputter deposition. Such inorganic surface coating 40 can be formed, for example, of silicon dioxide, silicon oxinitride, silicon nitride, aluminum oxide, magnesium fluoride, tantalum pentoxide, and glass. Typical coating thickness values readily achievable for these inorganic materials with the appropriately selected deposition process can be in the range from about 0.01 micrometer to about 1.5 micrometers.

Alternatively, surface coating 40 can be a polymeric organic coating deposited on upper surface 32 either in a single coating procedure or in multiple, sequential coating procedures so as to achieve a greater coating thickness. Preferably, a polymeric organic surface coating 40 is deposited by a spin-coating procedure in which the polymeric organic material is dissolved in a solvent liquid, the solvent being evaporated during spin-coating and thus leaving a nominally dry polymeric organic coating of a uniform thickness on the crystal surface 32. The coating can be further dried by heating or baking at a suitable temperature for a period of time, as is well known in the art of forming polymeric organic coatings by spin-coating. A preferred dry coating thickness range is from about 0.5 micrometer to about 2.5 micrometers, thickness values within this range being readily achievable by selecting appropriate concentration levels of the polymeric organic material in the solvent and by selecting appropriate rotational speeds for the spin-coating procedure. When using multiple, sequential coating procedures, the coating thickness range may be extended to a value of about 50 micrometers.

If the inorganic or polymeric organic surface coating 40 is intended as a protective coating during device fabrication and during subsequent use of a device, in accordance with the invention, such protective coating need not be patternable, i.e., the coating remains permanently as uniform surface coating 40 on the upper surface 32 of device 10.

If, however, surface coating 40 is to be patterned so as to form, for example, an optical grating over at least a portion of surface coating 40, coating materials and patterning procedures have to be selected from among materials and patterning procedures known in the art of so-called lithographic patterning. For example, when surface coating 40 is selected to be an inorganic coating, the coating 40 may be overcoated with an electron beam responsive lithographically patternable coating serving solely as a "pattern transfer means" which, upon electron beam exposure and patterning by known lithographic processes, becomes a so-called "conformable mask" overlying coating 40. Surface coating 40 can then be patterned, for example, by wet or dry etching procedures, through openings created in the lithographically patternable coating. Subsequent to patterning surface coating 40, the overlying lithographically patterned coating may remain over coating 40, or it may be removed.

When surface coating 40 is selected to be a polymeric organic coating, the above pattern transfer means (the lithographically patternable coating overlying surface coating 40) can be obviated, if the polymeric organic material used to form coating 40 is selected to be a material responsive to electron beam exposure once disposed as a coating 40 on surface 32. For example, polymeric organic materials such as polymethylmethacrylate, polyethylmethacrylate, polybutylmethacrylate, and mixtures thereof are responsive to exposure by an electron beam having a preferred electron energy range from about 10 keV to about 100 keV, this electron energy range being achievable in electron beams generated in so-called scanning electron microscopes (SEM) or in scanning transmission electron microscopes (STEM) which can be advantageously used as electron beam exposure means for exposure of a polymeric organic coating 40 and the underlying surface 32 of ferroelectric crystal 31. Another preferred polymeric organic material useful in the practice of the invention is polymethylglutarimide.

Polymeric organic surface coatings 40 particularly useful as protective surface coatings can be prepared by spin-coating procedures from, for example, polycarbonate, polyamide, polyimide, and polystyrene materials.

It has been observed that certain ones of the surface coating materials formed as a surface coating 40 tend to develop and retain a surface charge attributable to the effects of electron beam exposure. This surface charge may result in spurious, i.e., uncontrolled, discharge patterns which may adversely affect the fineness or fidelity of both the electron beam inverted domains and the grating lines of an optical grating to be formed during a subsequent pattern development sequence of steps. This surface charge effect can be substantially eliminated or controlled by depositing over the surface coating an electron charge dissipating film, whereby this film is sufficiently thin to remain transmissive to the electrons of the incident electron beam and yet is at least partially electrically conductive so as to dissipate the surface charge when the film is connected electrically to an electrically conductive member of an electron beam exposure apparatus.

Charge dissipation films have been shown to be effective at a currently preferred film thickness in the range between about 0.00025 micrometer (25 Angstrom units) and about 0.01 micrometer (100 Angstrom units). Such thin film can be deposited by known vacuum evaporation or sputtering processes from metallic or semiconductive materials. For example, thin films of chromium, platinum, tantalum, tin oxide, and indium-tin oxide can advantageously function as charge dissipating films in conjunction with a surface coating 40 which may exhibit surface charging effects in the absence of such a film.

Ferroelectric crystals 31 found to be particularly useful for the manufacture of ferroelectric light frequency doubler devices 30 with a surface coating 40 on an upper surface 32 thereof are commercially available uniformly poled crystals of $KTiOPO_4$, $LiNbO_3$, and $LiTaO_3$. These preferred crystals are available in the form of circular crystal wafers, from which individual devices 30 of rectangular or square shape can be cut either following the manufacture of a plurality of devices spaced from one another on the wafer, or prior to manufacture of each separate ferroelectric light frequency doubler device 30.

Referring now particularly to FIG. 2B, there is shown the device 30 of FIG. 2A mounted on its lower surface 33 against an electrically conductive mounting means 47, which can be an electrically grounded stub or plate. Electrical connection between surface 33 and mounting means 47 is achieved by an electrically conductive thin layer 46 disposed either on lower surface 33 or spread as an electrically conductive liquid or paste on the upper surface of mounting means 47 or on lower surface 33, so that an effective and uniform electrically conductive layer 46 is formed over at least that portion of lower crystal surface 33 which is located opposite a corresponding surface portion of a polymeric organic surface coating 40 selected to be responsive to exposure by a scanning electron beam schematically indicated at 37. Scanning electron beam 37 is scanned across the width dimension W spatially periodically with a periodicity P along the length dimension L of surface coating 40, thereby producing a latent response in coating 40 and at the same time producing inverted polarity domains 39 in the crystal so that a plurality of alternating polarity domains of periodicity P are formed in crystal 31, as schematically indicated by arrows 36 and 39. The energy and intensity (beam current density) levels of scanning electron beam 37 are selected so that inverted polarity domains 39 extend at least partly through the crystal thickness T from upper surface 32 toward lower surface 33.

Two surprising effects, attributable to the electron beam responsive polymeric organic coating 40 on upper crystal surface 32, but not as yet fully understood, were observed upon electron beam exposure by one and the same electron beam 37 of a device 30 from which a portion of coating 40 had been removed prior to electron beam exposure (not shown): (1) with scanning electron beam 37 incident and scanning across the surface of coating 40, no discernible damage was observed near upper crystal surface 32, whereas damaged regions 20, characteristic of electron beam exposure in accordance with the prior art (see FIGS. 1A, 1B) were evident in electron beam exposed regions where coating 40 had been removed, and (2) the electron beam scan speed, i.e., the rate at which the beam is scanned across the width dimension W of the coating 40, could be increased about four-fold while still achieving complete polarity inversion domains extending substantially across the thickness T of the crystal, compared to the beam scan rate required to form similarly complete polarity inversion zones in the portion of the crystal from which coating 40 had been removed prior to electron beam exposure. For example, with polymeric organic coating 40 present, the scan speed of the electron beam 37 could be increased to about 800 micrometers/second from about 200 micrometers/second, thus significantly reducing the total electron beam "writing time" required for formation of a desired number of alternating polarity domains in a ferroelectric crystal.

Substantially equivalent effects were observed when an inorganic surface coating 40 was disposed on upper crystal surface 32 at a coating thickness of approximately 0.5 micrometer.

Referring now particularly to FIG. 2C, there is shown a third and desired effect of a polymeric organic coating 40 on upper surface 32 of crystal 31. Since the polymeric material of coating 40 was selected to be responsive to electron beam exposure, the latent electron beam induced pattern in coating 40 can be selectively removed by a suitable organic solvent which selectively dissolves away regions or zones of coating 40 previously exposed to electron beam 37. Selective removal of exposed portions of coating 40 can be accomplished by solvent spraying, dipping, or by other procedures known in the field of lithographic patterning of polymeric organic coatings.

By selective removal of previously electron beam exposed portions of coating 40, a polymeric organic optical grating with periodically spaced remaining zones or lines 43 is formed registratively aligned with respect to the zones or domains of alternating polarity in crystal 31, as schematically indicated by arrows 36 and 39. Thus, optical grating lines 43 and spaces between successive grating lines are of the same spatial periodicity P as the alternating polarity zones 36, 39. A preferred value of periodicity P is in the range from about 1 micrometer to about 50 micrometers, values selected from within this range being dependent on the frequency of light selected to be incident at a light entrance surface of the device, the frequency of the frequency-doubled light to be obtained, and the selection of the optical grating to be of first order or of higher order.

Also indicated schematically in FIG. 2C is a solid-state laser diode 44, driven by a power supply 45, directing a laser light beam 41 of a first light frequency at light entrance surface 34 of crystal 31. Due to the desired phase matching properties of the alternating domains 36, 39 in the crystal, a fraction of laser light beam 41 is converted to laser light of a second light frequency double the first light frequency which emanates from light exit surface 35. For example, laser light beam 41 can be a red or infrared laser beam of a wavelength in the range from about 700 nm to about 850 nm. Accordingly, frequency doubled laser light beam 42 would be a near-ultraviolet or blue light beam having a wavelength range from about 350 nm to about 425 nm. Laser light beam 41 can, for example, be a far-infrared laser beam of a wavelength of about 10.6 micrometers, in which case the light beam 42 would have a wavelength of 5.3 micrometers.

Particularly desirable optical effects of the polymeric organic optical grating lines or zones 43 will be described below, particularly in conjunction with FIG. 3A and FIG. 5.

Figure 3A:
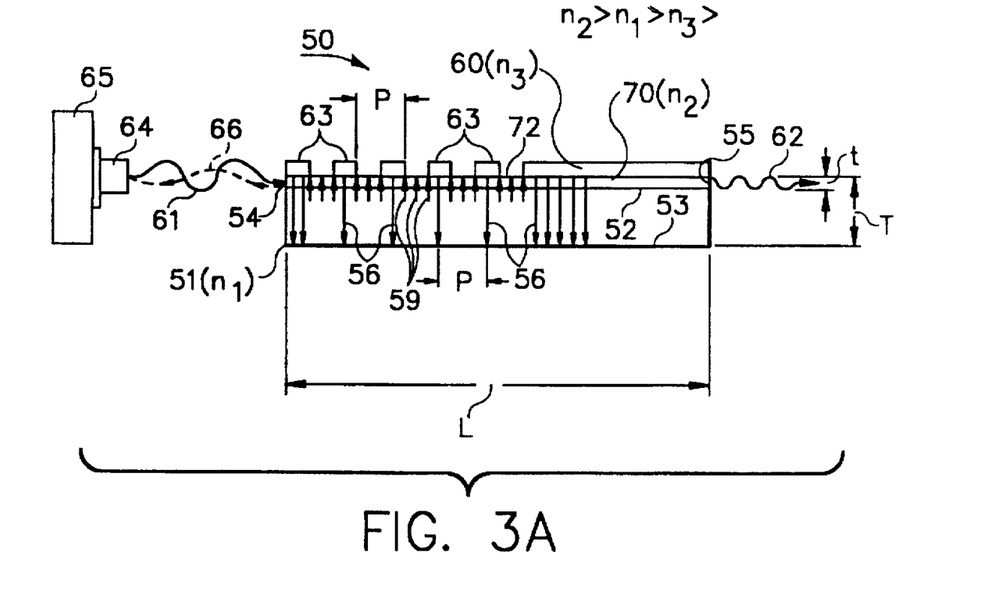
FIG. 3A is a schematic side view of another embodiment of a ferroelectric light frequency doubler device in accordance with the present invention, having a planar optical waveguide layer formed throughout an upper surface region of a ferroelectric crystal and a portion of a surface coating on the upper surface formed as an optical grating over the waveguide layer and registratively aligned with respect to periodic alternating polarity domains in a ferroelectric crystal, and indicating a reflected fraction of an incident laser light beam directed back into a solid-state laser light source to stabilize the first frequency of light provided by the laser light source.

Referring now to FIG. 3A, there is shown a schematic side view of a ferroelectric light frequency double device 50 having a surface coating 60 which has been formed into an optical grating with grating lines 63 over a portion thereof. Coating 60 is disposed on an upper surface 72 of a planar waveguide layer 70 which had been formed to a waveguide layer thickness t on surface 52 of crystal 51 of thickness T prior to deposition of surface coating 60.

Figure 3B:
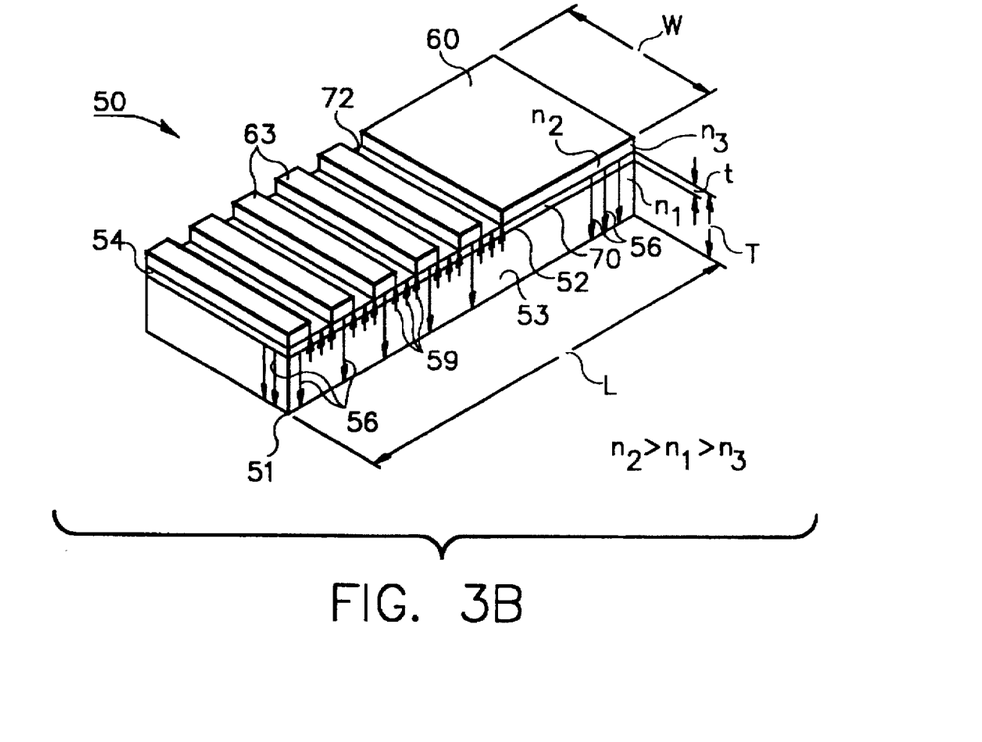
FIG. 3B is a schematic perspective view of the device shown in FIG. 3A.

The principal object of planar waveguide layer 70 is to confine the propagation of an incident laser light beam 61 of a first frequency, directed at a waveguide layer light entrance surface 54, and the propagation of a laser light beam 62 of a second frequency double the first frequency, within the thickness t of the waveguide layer, so as to effectively increase the power density of the light beams, i.e., to "concentrate" the laser light beams into a reduced cross-sectional propagation area of value t×W (see FIG. 3B).

In optical terms, waveguide layer 70 propagates light by the concept of "total internal reflections" if the optical refractive index $n_2$ of waveguide layer 70 has a larger value than the optical refractive index values of optical media to either side of the waveguide layer. In that regard, the optical refractive index value $n_3$ of a polymeric organic coating has a preferred range from about 1.5 to about 1.8, and the optical refractive index value of the air spaces between optical grating zones or lines 63 is taken as 1.0. The optical refractive index value $n_1$ of ferroelectric crystal 31 may be in the range from about 1.5 to about 3.0, dependent upon selection of a particular one of the preferred crystals.

In instances where surface coating 60 is selected to be a uniform or a patterned coating of an inorganic material, the optical refractive index of such inorganic coating may be in a range from about 1.35 (magnesium fluoride) to about 2.5 (tantalum pentoxide). To achieve light propagation in waveguide layer 70 by "total internal reflection," the ferroelectric crystal 31 and its waveguide layer 70 have to be selected so as to provide respective optical refractive index values at a selected light frequency in accordance with the refractive index of the inorganic surface coating 60.

For any particular preferred crystal with an optical refractive index value $n_1$, a waveguide layer 70 can be formed to have an optical refractive index value $n_2$, where $n_2 > n_1$, by known chemical treatment processes at the selected crystal surface, whereby so-called ion exchange reactions are believed to occur to a depth or thickness t from the crystal surface. A currently preferred value of waveguide layer thickness t is in the range from about 1.0 micrometer to about 8 micrometers.

Referring again to FIG. 3A, polarity inverted domains 59, uniformly poled domains 56, and polymeric organic optical grating zones or lines 63 each have a periodicity P, and having been formed as described previously. Since propagation of laser light beams 61 and 62 is now confined to the thickness t of optical waveguide layer 70, polarity inverted domains 59 need only extend from the upper surface 72 of waveguide layer 70 through layer 70, rather than extending completely to lower surface 53 of crystal 51. Thus, lower electron beam exposure levels may be possible to form these "shortened" polarity inversion domains 59, or alternatively, the scan speed of the scanning electron beam can be increased.

It has now been found that a small fraction of laser beam 61 from laser diode 64, incident on waveguide light entrance surface 54, is reflected back into laser diode 64 as reflected beam 66, if grating lines 63 of the optical grating are positioned in the vicinity of light entrance surface 54. This relatively small fraction 66 of reflected light (shown in dotted outline in FIG. 3A) has been shown to be sufficient to stabilize the frequency of laser light 61 emitted by laser diode 64 (driven by power supply 65), or, alternatively, to provide so-called "phase-locking" of emitted laser beam 61 to the periodicity P of the optical grating and, therefore, to the periodicity P of the alternating polarity domains 59, 56, extending at least throughout waveguide layer 70.

Referring now to FIG. 3B, there is shown a schematic perspective view of the ferroelectric light frequency doubler device 50 depicted in FIG. 3A, indicating that planar waveguide layer 70 uniformly covers the upper surface 52 of crystal 51 over an area given by L×W, and having a thickness t.

Figure 4:
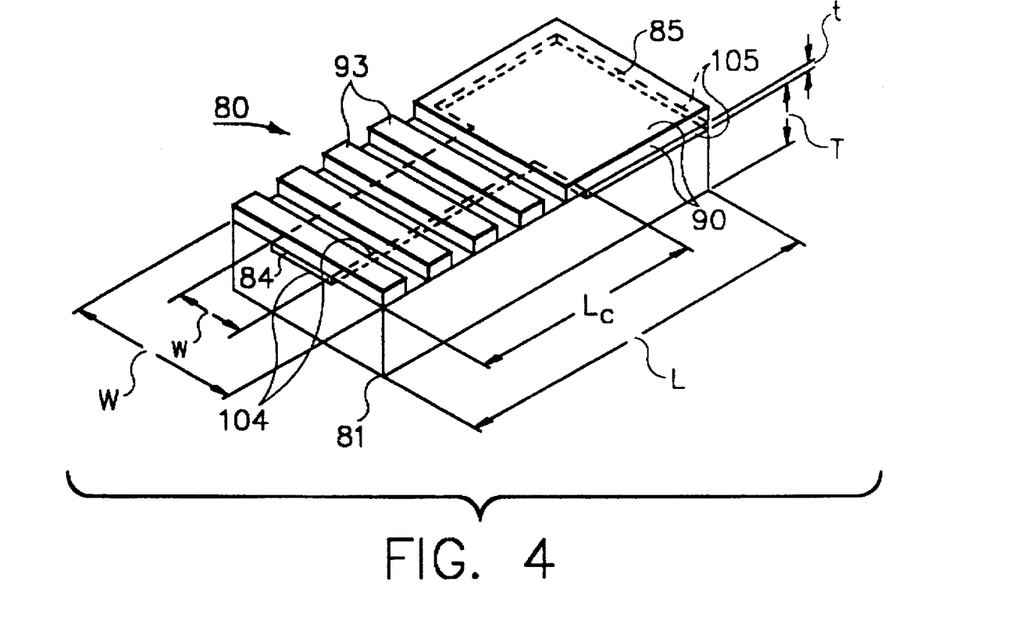
FIG. 4 is a schematic perspective view of another embodiment of a ferroelectric light frequency doubler device in accordance with the present invention, having a channel waveguide extending from a light entrance surface of the device and terminating in a planar waveguide layer along a length dimension of the device, and indicating a portion of an optical grating over the channel waveguide and a uniform surface coating over the waveguide layer.

Referring now to FIG. 4, there is shown schematically a perspective view of a ferroelectric light frequency doubler device 80 having a surface coating 90 and optical grating lines or zones 93 disposed on an upper surface of a ferroelectric crystal 81. A channel waveguide 104 is formed in an upper surface of the ferroelectric crystal 81, the channel waveguide having a width dimension w approximately centered with respect to a width dimension W of crystal 81. A currently preferred channel waveguide width dimension w is in the range from about 1 micrometer to about 20 micrometers. The channel waveguide 104 extends along a length dimension L of crystal 81 from a channel waveguide light entrance surface 84 by a distance $L_c$, whereupon the channel waveguide 104 merges into a planar waveguide layer 105 having the full width dimension W of crystal 81 and having a waveguide layer light exit surface 85. Channel waveguide 104 and waveguide layer 105 are formed in an upper surface of crystal 81 by the chemical treatment procedures described previously with reference to FIG. 3A. Thickness dimensions t of the channel waveguide 104 and of planar waveguide layer 105 are identical, and are in a preferred range from about 1.0 micrometer to about 8 micrometers. The principal object of channel waveguide 104 is to further concentrate a laser light beam of a first light frequency (not shown), incident on channel waveguide light entrance surface 84, by reducing the cross-sectional area available for light propagation (by the previously referred to "total internal reflection" optical principle) to a value w×t, as compared to the area W×t of planar waveguide layer 70 in FIG. 3B.

Figure 5:
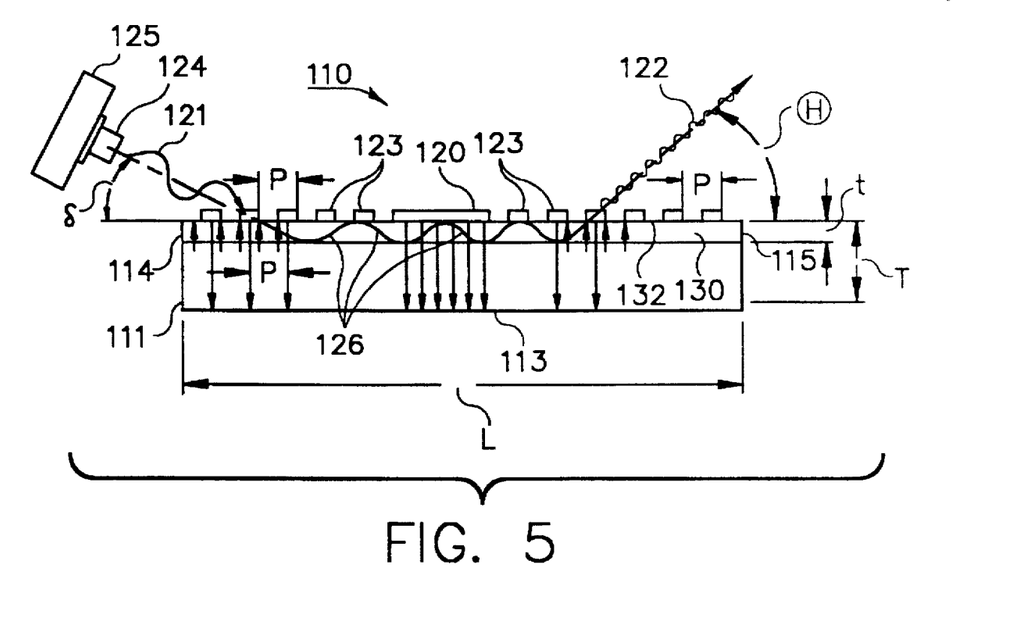
FIG. 5 is a schematic side view of another embodiment of a ferroelectric light frequency doubler device in accordance with the present invention in which light of a first frequency from a solid-state laser light source is incident under an angle on the surfaces of a first portion of an optical grating disposed over a planar waveguide layer formed in a surface region of a ferroelectric crystal, and in which laser light of a second frequency double the first frequency is emanating under an angle from the surfaces of a second portion of the optical grating.

Referring now to FIG. 5, there is shown a schematic side view of a ferroelectric light frequency doubler device 110 having a planar waveguide layer 130 formed in an upper surface thereof, and a surface coating 120 and portions of an optical grating with grating lines 123 shown as formed to either side thereof. Grating lines or zones 123 are registratively oriented with respect to domains of alternating polarity of an electric field within a ferroelectric crystal 111, as schematically indicated by arrows and the periodicity P. A solid-state laser diode 124, driven by a power supply 125, emits a laser light beam 121 of a first light frequency, the beam directed at the grating lines 123 of a first grating portion under a selected angle d with respect to upper surface 132 of waveguide layer 130. In view of the relationships $n_2 > n_1 > n_3$ of the optical refractive indices of layer 130, crystal 111, and surface coating 120, 123, respectively, and in view of the fact that the optical refractive index of the air space between and above grating lines 123 is taken as $n_{air} = 1.0$, laser light beam 121 can be surface-coupled from the grating surface into waveguide layer 130, wherein it propagates by totally internally reflected pathways schematically shown at 126. A laser beam 122 of a second light frequency double the first light frequency is shown emanating under an angle q from a second portion of periodically arranged grating zones or lines 123. Thus, an optical grating formed from a surface coating on a ferroelectric crystal can be advantageously deployed for surface-coupling laser light of a first frequency into phase matched optical zones of a ferroelectric light frequency doubler device, and for surface-coupling laser light of a second light frequency double the first frequency out of the device.

Alternatively, laser light beam 121 can be directed at a waveguide layer light entrance surface 114 and be coupled out as a frequency doubled laser light beam 122 under an angle H from the second portion of the optical grating. It is also possible to direct laser light beam 121 at the first portion of the optical grating under an angle β and to extract a frequency doubled laser light beam from waveguide layer light exit surface 115.

The above described options for directing a laser light beam of a first light frequency and for extracting a frequency doubled laser light beam can also be implemented when the surface coating 120 and optical grating lines 123 are formed of a selected inorganic material which was patterned by a patterning procedure similar to the procedure described in conjunction with FIGS. 2A–C.

Figure 6A:
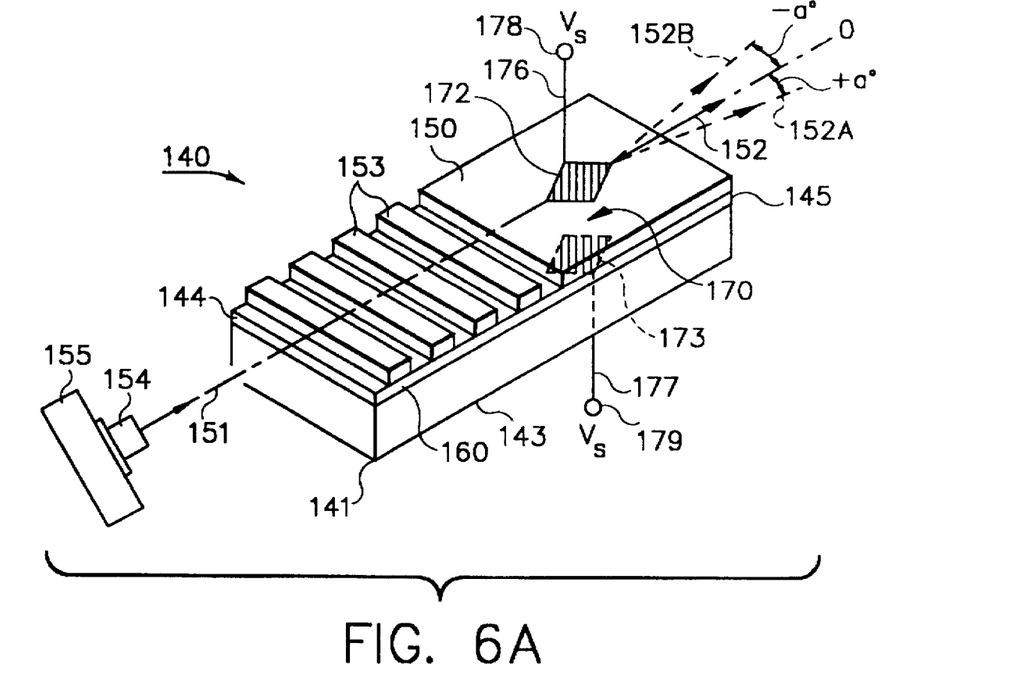
FIG. 6A is a schematic perspective view of another embodiment of a ferroelectric light frequency doubler device in accordance with the present invention in which shaped electrically conductive opposing electrodes on a surface coating and on a lower device surface, respectively, form a beam steering section whereby a frequency doubled laser light beam can be steered or deflected angularly in response to an electrical beam steering signal applied to the electrodes.

Referring now to FIG. 6A, there is shown schematically a perspective view of a ferroelectric light frequency doubler device 140, having formed in an upper surface of a ferroelectric crystal 141 a waveguide layer 160, on which is disposed a surface coating 150 with portions 153 thereof formed into an optical grating designed to be registratively aligned with spatially periodic alternating polarity domains (not shown) of an electric field extending at least through waveguide layer 160. A beam steering section, generally indicated at 170, is located over a continuous and uniform portion of surface coating 150 and comprises a shaped upper electrode 172 of an electrically conductive material deposited on coating 150, and an opposingly deposited electrically conductive lower electrode 173 on lower surface 143 of crystal 141.

Figure 6B:
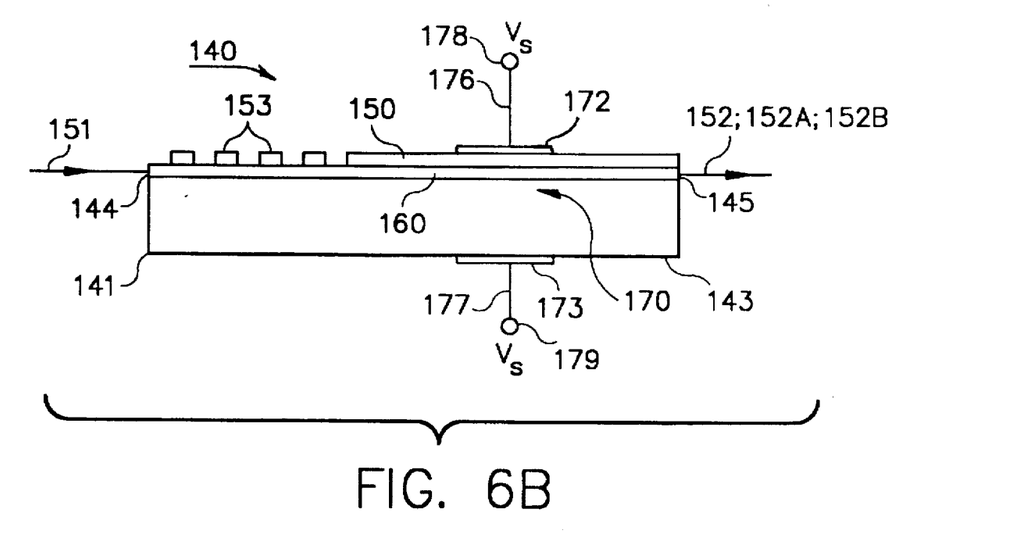
FIG. 6B is a schematic side view of the embodiment shown in FIG. 6A.

Viewed in conjunction with FIG. 6B, which is a schematic side view of the device 140 shown in FIG. 6A, electrically conductive electrodes 172 and 173 are connected by conductive leads 176 and 177, respectively, to respective terminals 178 and 179. Upon application of a beam steering signal $V_s$ between terminals 178 and 179, frequency doubled laser light beam 152 can be steered or deflected from an unsteered center position 152 by relatively small angular deviations ±a° to beam positions 152A and 152B, respectively, whereby frequency doubled laser beams 152, 152A and 152B emanate from waveguide layer light exit surface 145 when a laser light beam 151 of a first light frequency from a solid-state diode laser 154 with associated power supply 155 is directed at a waveguide layer light entrance surface 144.

Beam steering electrodes 172 and 173 can be formed on respective device surfaces by deposition of conductive metallic thin films, for example, thin films of aluminum, chromium, tantalum, and the like by pattern-shaping processes well known in the semiconductor industry.

Beam steering signals $V_s$ can be temporally varying sinusoidal, sawtooth, or trapezoidal electrical voltage signals, and these voltages can be applied with opposing polarity simultaneously to both electrodes so that, for example, a positive-going temporally ramped voltage is applied to terminal 178 while simultaneously an inverted negative-going temporally ramped voltage is applied to terminal 179 of the beam steering section 170. It has been found that frequency doubled laser beam 152 can be deflected by angles a≦±1° about the center position of beam 152 when a beam steering voltage of about ±1000 volt in magnitude is applied between terminals 178 and 179 for a typical thickness T=0.5 millimeter (500 micrometers) of a ferroelectric crystal 141.

Figure 7:
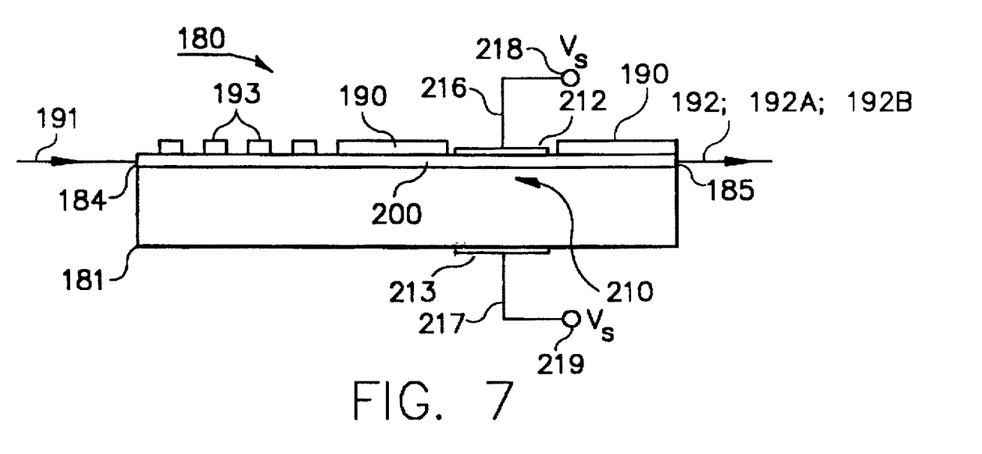
FIG. 7 is a schematic side view of a modification of the embodiment shown in FIG. 6B, indicating the removal of the surface coating from the portion of the device surface where an upper electrode is now disposed on an upper surface of a planar waveguide layer.

Referring now to FIG. 7, there is shown a schematic side view of a ferroelectric light frequency doubler device 180 having a surface coating 190 and optical grating lines or zones 193 formed over portions thereof. A beam steering section 210 is disposed toward a light exit surface 185 of a planar waveguide layer 200, the beam steering section comprising shaped opposing electrically conductive upper and lower electrodes 212 and 213, respectively, and respective conductive leads 216 and 217 to respective terminals 218 and 219.

In contrast to the beam steering section 170 described with reference to FIGS. 6A and 6B, the upper electrode 212 of FIG. 7 is disposed directly on an upper surface of a waveguide layer 200 which has been formed in an upper surface region of a ferroelectric crystal 181. Waveguide layer 200 has a plurality of spatially periodic alternating polarity domains extending therethrough (not shown), and grating lines or zones 193 are registratively aligned with respect to these alternating polarity domains. A laser light beam 191 of light of a first frequency is directed at a waveguide entrance surface 184, and emanates as a laser light beam 192 of light of a second frequency double the first frequency from a waveguide layer light exit surface 185 in a center position (unsteered) within a beam steered range bounded by steered or deflected beams 192A and 192B (see FIG. 6A for angular beam deflection) upon application of a beam steering voltage signal $V_s$ between beam steering electrode terminals 218 and 219.

It is to be understood that the embodiments detailed herein are merely illustrative of the general principles of the present invention. Various modifications and other arrangements can be contemplated without departing from the spirit of the invention. For example, new or improved electron beam responsive polymeric organic materials and coatings formed therefrom can be advantageously used in the practice of the invention. Likewise, new or improved ferroelectric crystals may become available which can be used in the practice of the present invention. Also, the channel waveguide depicted schematically in FIG. 4 can, for example, be extended throughout the entire length dimension L of the device, and a beam steering section can be associated with a ferroelectric light frequency doubler device having such extended channel waveguide. It will be appreciated that a selection of a particular inorganic or polymeric organic material as the material for a surface coating includes a selection of lithographic procedures adapted for patterning the surface coating on the device subsequent to formation of inverted polarity domains within a chosen ferroelectric crystal. While the instant invention is directed to a ferroelectric frequency doubler device, other devices such as, for example, surface acoustic devices and piezoelectric devices can be contemplated in ferroelectric crystals having a surface coating and a selectively inverted domain structure generated by a scanning electron beam.

| PARTS LIST |
| --- |
| 10 ferroelectric light frequency doubler device (prior art) |
| 11 ferroelectric crystal |
| 12 upper crystal surface |
| 13 lower crystal surface |
| 14 light entrance surface |
| 15 light exit surface |
| 16 uniformly poled domains |
| 17 electron beam |
| 18 electron beam deflection |
| 19 inverted domains |
| 20 damaged surface regions |
| 21 light beam of first light frequency |

PARTS LIST

| | |
|---|---|
| 22 | frequency doubled light beam |
| 30 | ferroelectric light frequency doubler device (invention) |
| 31 | ferroelectric crystal |
| 32 | upper crystal surface |
| 33 | lower crystal surface |
| 34 | light entrance surface |
| 35 | light exit surface |
| 36 | uniformly poled domains |
| 37 | electron beam |
| 39 | inverted domains |
| 40 | surface coating |
| 41 | light beam of first light frequency |
| 42 | frequency doubled light beam |
| 43 | optical grating lines |
| 44 | laser diode |
| 45 | power supply |
| 46 | electrically conductive thin layer |
| 47 | electrically conductive mounting means |
| 50 | ferroelectric light frequency doubler device |
| 51 | ferroelectric crystal |
| 52 | upper crystal surface |
| 53 | lower crystal surface |
| 54 | waveguide layer light entrance surface |
| 55 | waveguide layer light exit surface |
| 56 | uniformly poled domains |
| 59 | inverted domains |
| 60 | surface coating |
| 61 | light beam of first light frequency |
| 62 | frequency doubled light beam |
| 63 | optical grating lines |
| 64 | laser diode |
| 65 | power supply |
| 66 | reflected beam |
| 70 | planar waveguide layer |
| 72 | upper surface of waveguide layer |
| 80 | ferroelectric light frequency doubler device |
| 81 | ferroelectric crystal |
| 84 | channel waveguide light entrance surface |
| 85 | waveguide layer light exit surface |
| 90 | surface coating |
| 93 | optical grating lines |
| 104 | channel waveguide |
| 105 | planar waveguide layer |
| 110 | ferroelectric light frequency doubler device |
| 111 | ferroelectric crystal |
| 113 | lower crystal surface |
| 114 | waveguide layer light entrance surface |
| 115 | waveguide layer light exit surface |
| 120 | surface coating |
| 121 | light beam of a first light frequency |
| 122 | frequency doubled light beam |
| 123 | optical grating lines |
| 124 | laser diode |
| 125 | power supply |
| 126 | pathways of total internal reflection |
| 130 | planar waveguide layer |
| 132 | upper surface of waveguide layer |
| 140 | ferroelectric light frequency doubler device |
| 141 | ferroelectric crystal |
| 143 | lower crystal surface |
| 144 | waveguide layer light entrance surface |
| 145 | waveguide layer light exit surface |
| 150 | surface coating |
| 151 | light beam of a first light frequency |
| 152 | frequency doubled light beam; center position |
| 152A | frequency doubled light beam; +a°deflection |
| 152B | frequency doubled light beam; -a°deflection |
| 153 | optical grating |
| 154 | laser diode |
| 155 | power supply |
| 160 | waveguide layer |
| 170 | beam steering section |
| 172 | upper electrode |
| 173 | lower electrode |
| 176 | conductive lead |
| 177 | conductive lead |
| 178 | terminal |
| 179 | terminal |
| 180 | ferroelectric light frequency doubler device |
| 181 | ferroelectric crystal |
| 184 | waveguide layer light entrance surface |
| 185 | waveguide layer light exit surface |
| 190 | surface coating |
| 191 | light beam of a first light frequency |
| 192 | frequency doubled light beam; center position |
| 192A | frequency doubled light beam; deflected |
| 192B | frequency doubled light beam; deflected |
| 193 | optical grating lines |
| 200 | planar waveguide layer |
| 210 | beam steering section |
| 212 | upper electrode |
| 213 | lower electrode |
| 216 | conductive lead |
| 217 | conductive lead |
| 218 | terminal |
| 219 | terminal |

What is claimed is:

1. A ferroelectric light frequency doubler device having a surface coating, the device comprising:

a ferroelectric crystal having a length dimension L, a width dimension W, and a thickness dimension T, and characterized by an upper surface of area L×W and an opposing lower surface which is separated from the upper surface by the thickness dimension T, a light entrance surface of area W×T and an opposing light exit surface separated from the light entrance surface by the crystal length dimension L;

a plurality of distinct ferroelectric domains extending from the upper surface toward the lower surface of the crystal, and extending from the light entrance surface toward the light exit surface of the crystal, the ferroelectric domains disposed substantially parallel to the light entrance and light exit surfaces and being distinct by having a periodicity of an alternating polarity among each successive domain of the plurality of domains;

the surface coating being formed of nonconducting material disposed on the upper surface of the crystal, and patterned to function as an optical grating registratively aligned with respect to alternating distinct ferroelectric domains extending from the upper surface; and the distinct ferroelectric domains having the periodicity of an alternating polarity are formed in a ferroelectric crystal of uniform and non-alternating polarity domains by exposure of the upper surface of the crystal to an electron beam scanned across the width dimension W at periodic intervals along the length dimension L, the electron beam incident on the surface coating disposed on the upper surface of the crystal, the surface coating adapted to being responsive to the electron beam, whereby distinct domains of polarity opposite to the uniform polarity domains are generated in the crystal, and whereby the unpatterned surface coating becomes selectively removable.

2. The ferroelectric light frequency doubler device of claim 1, wherein the surface coating is a coating formed of an inorganic material which is adapted to be patterned as the optical grating.

3. The ferroelectric light frequency doubler device of claim 2 wherein the inorganic material is $Ta_2O_5$.

4. The ferroelectric light frequency doubler device of claim 1, wherein the surface coating is a coating formed of a polymeric organic material which is adapted to be patterned as the optical grating.

5. The ferroelectric light frequency doubler device of claim 1, wherein the electron beam has an electron beam energy in a preferred range from about 10 keV to about 100 keV, and the surface coating is a polymeric organic coating responsive to the electron beam and is selectively removed by an organic solvent to form the optical grating.

6. The ferroelectric light frequency doubler device of claim 1, wherein the ferroelectric crystal is selected from the group consisting of $KTiOPO_4$, $LiNbO_3$, and $LiTaO_3$.

7. The ferroelectric light frequency doubler device of claim 1, wherein the periodicity of the distinct ferroelectric domains and of the optical grating registratively aligned thereto is a periodic distance preferably in the range from about 1 micrometer to about 50 micrometers.

8. The ferroelectric light frequency doubler device of claim 1, wherein the surface coating has a coating thickness in a preferred range from about 0.01 micrometer to about 50 micrometers.

9. A ferroelectric light frequency doubler device having a surface coating, the device comprising:
   a ferroelectric crystal having a length dimension L, a width dimension W, and a thickness dimension T, and characterized by an upper surface of area L×W and an opposing lower surface which is separated from the upper surface by the thickness dimension T, a light entrance surface of area W×T and an opposing light exit surface separated from the light entrance surface by the crystal length dimension L;
   a plurality of distinct ferroelectric domains extending from the upper surface toward the lower surface of the crystal, and extending from the light entrance surface toward the light exit surface of the crystal, the ferroelectric domains disposed substantially parallel to the light entrance and light exit surfaces and being distinct by having a periodicity of an alternating polarity among each successive domain of the plurality of domains;
   the surface coating being formed of nonconducting material disposed on the upper surface of the crystal, and functioning as a uniform protective coating; and
   the distinct ferroelectric domains having the periodicity of an alternating polarity are formed in a ferroelectric crystal of uniform and non-alternating domains by exposure of the upper surface of the crystal to an electron beam scanned across the width dimension W at periodic intervals along the length dimension L, the electron beam incident on the surface coating disposed on the upper surface of the crystal, whereby distinct domains of polarity opposite to the uniform polarity domains are generated in the crystal.

10. The ferroelectric light frequency doubler device of claim 9, wherein the surface coating is a coating formed of an inorganic material.

11. The ferroelectric light frequency doubler device of claim 9, wherein the surface coating is a coating formed of a polymeric organic material.

12. A method of manufacturing a ferroelectric light frequency doubler device having a surface coating, the method comprising the steps of:
   providing a ferroelectric crystal having a uniform polarity of a ferroelectric domain extending between an upper surface and an opposing lower surface which is separated from the upper surface by a crystal thickness dimension T, the crystal having a length dimension L and a width dimension W, the upper and lower surface each having an area L×W, a light entrance surface of area W×T and an opposing light exit surface separated from the light entrance surface by the crystal length dimension L;
   providing an electron beam responsive surface coating on the upper surface of the crystal;
   coupling electrically conductively the lower crystal surface to an electrically conductive member of an electron beam exposure means;
   exposing the surface coating to a scanning electron beam having a preferred electron beam energy range from about 10 keV to about 100 keV, the electron beam being scanned across the width dimension W at periodic intervals along the length dimension L, whereby distinct domains of polarity opposite to the uniform polarity domains are generated in the crystal, thereby forming distinct ferroelectric domains with a periodicity of alternating polarity in the crystal, and whereby the surface coating becomes selectively removable;
   removing selectively the surface coating, thereby forming an optical grating registratively aligned with respect to each second one of the alternating polarity ferroelectric domains in the crystal;
   directing a laser light beam from a laser light source of a first light frequency at the light entrance surface of the crystal; and
   monitoring a laser light beam of a second light frequency emanating from the light exit surface of the crystal, the second light frequency being double the first light frequency.

13. The method of manufacturing of claim 12, further including a step of depositing an electron charge dissipating film over the surface coating, and wherein the coupling step includes a step of connecting electrically conductively the charge dissipating film to the conductive member.

14. The method of claim 13, further including the step of forming a layer which is at least partially conductive and electron beam transmissive and having a preferred thickness in the range between about 0.0025 micrometer (25 Angstrom units) and about 0.01 micrometer (100 Angstrom units).

15. A method of producing a ferroelectric light frequency doubler device having a surface coating, the device comprising the steps of:
   a) providing a ferroelectric crystal having a length dimension L, a width dimension W, and a thickness dimension T, and characterized by an upper surface of area L×W and an opposing lower surface which is separated from the upper surface by the thickness dimension T, a light entrance surface of area W×T and an opposing light exit surface separated from the light entrance surface by the crystal length dimension L;
   b) forming a plurality of distinct ferroelectric domains extending from the upper surface toward the lower surface of the crystal;
   c) forming a surface coating on the upper surface of the crystal; and
   d) using an electron beam to form a grating in the surface coating simultaneously with inverting the domains in alternating ones of the distinct ferroelectric domains.

16. A ferroelectric light frequency doubler device having a surface coating, the device comprising:
   a ferroelectric crystal having a length dimension L, a width dimension W, and a thickness dimension T, and characterized by an upper surface of area L×W and an opposing lower surface which is separated from the upper surface by the thickness dimension T, a light entrance surface of area W×T and an opposing light exit surface separated from the light entrance surface by the crystal length dimension L;

a plurality of distinct ferroelectric domains extending from the upper surface toward the lower surface of the crystal, and extending from the light entrance surface toward the light exit surface of the crystal, the ferroelectric domains disposed substantially parallel to the light entrance and light exit surfaces and being distinct by having a periodicity of an alternating polarity among each successive domain of the plurality of domains;

the surface coating being formed of nonconducting material disposed on the upper surface of the crystal, and patterned to function as an optical grating registratively aligned with respect to alternating distinct ferroelectric domains extending from the upper surface;

wherein at least a fraction of a laser light beam from a laser light source of a first light frequency directed at the light entrance surface of the crystal emanates from the light exit surface as a laser light beam of light of a second frequency which is double the first frequency; and the shaped electrically conductive electrode disposed on the upper surface is disposed on the crystal in an area from which the surface coating has been removed.

17. The ferroelectric light frequency doubler device of claim 16, wherein the optical grating provides optical feedback to the laser light source through the light entrance surface of the crystal, whereby the first frequency of the laser light beam is frequency stabilized.

18. The ferroelectric light frequency doubler device of claim 16, further including a light beam steering section located along the length dimension L of the crystal toward the light exit surface and located beyond the plurality of distinct ferroelectric domains, the light beam steering section comprising shaped electrically conductive electrodes disposed in opposing relationship on the upper and lower surfaces, whereby light beam steering of the frequency doubled laser light beam is actuated by application of an electrical light beam steering signal between the conductive electrodes, so that the frequency doubled laser light beam can emanate from the light exit surface throughout an angular range about the direction of an unsteered frequency doubled laser light beam.

19. The ferroelectric light frequency doubler device of claim 18, further including a shaped electrically conductive electrode disposed over a uniform, unpatterned portion of the surface coating which is disposed on the upper surface of the crystal.

* * * * *